United States Patent [19]

Kimura et al.

[11] Patent Number: 5,457,602
[45] Date of Patent: Oct. 10, 1995

[54] DESK-TOP INFORMATION PROCESSING APPARATUS HAVING A HEIGHT GREATER THAN ITS FRONT SURFACE WIDTH, A FIRST LEG WITH A CUT-OUT FOR COOLING AIR, AND A SECOND LEG WITH NON-ALIGNED ENDS

[75] Inventors: Koichi Kimura; Takashi Maruyama, both of Yokohama; Nobukazu Kondo, Fujisawa; Hiroaki Aotsu, Yokohama; Michikazu Isono, Kasugai; Shoji Matsui, Owari Asahi; Toshiyuki Edakawa, Owari Asahi; Sadao Nakatsuka, Owari Asahi; Toshio Shibata, Seto; Mitsuji Suzuki, Seto; Yoshio Kakihi, Seto; Chihiro Tsuchiya, Komaki; Tetuya Fukunaga; Takao Ohsawa, both of Tokyo; Noriyoshi Ogura, Sayama, all of Japan

[73] Assignee: Hitachi, Ltd., Tokyo, Japan

[21] Appl. No.: 617,880

[22] Filed: Nov. 26, 1990

[30] Foreign Application Priority Data

Dec. 30, 1989 [JP] Japan ..................... 1-344715

[51] Int. Cl.⁶ ................. H05K 7/20; G06F 1/16
[52] U.S. Cl. ............ 361/687; 361/695; 361/683
[58] Field of Search .................. 312/223.2, 236; 361/383, 384, 390–395, 399, 380, 679–687, 690–697, 724–727, 728–733, 736, 752, 796; 364/708, 708.1; 248/917–923

[56] References Cited

U.S. PATENT DOCUMENTS

| | | |
|---|---|---|
| 4,501,460 | 2/1985 | Sisler . |
| 4,698,782 | 10/1987 | Ng et al. ................. 364/708 |
| 4,949,934 | 8/1990 | Krenz et al. ............. 248/718 X |
| 5,038,308 | 8/1991 | Le et al. ................. 364/708 |

Primary Examiner—Leo P. Picard
Assistant Examiner—Michael W. Phillips
Attorney, Agent, or Firm—Antonelli, Terry Stout & Kraus

[57] ABSTRACT

A data processing apparatus comprising a disk unit, a power supply unit, at least one printed circuit board, a heat-exhaust fan, and a box accommodating the disk unit, the power supply unit, the printed circuit board, the heat-exhaust fan. Both the depth and height of the box are larger than the width and has first and second side surfaces defined by the depth and height, bottom and top surfaces defined by the depth and width, and front and rear surfaces defined the height and width. The disk unit and the power supply unit are disposed adjacent to the first side surface. The printed circuit board is disposed adjacent to the second side surface. The disk unit is disposed on the front surface, and the power supply unit is disposed on the rear surface. The apparatus is supported by a first leg and a second leg. Cooling air is exhausted through the first leg which includes a cut-out which communicates with a hollow portion. The second leg includes two non-aligned ends which extend beyond the sides of the apparatus and allow two of the apparatuses to be placed side by side.

3 Claims, 16 Drawing Sheets

FIG. I

DESK-TOP INFORMATION PROCESSING APPARATUS HAVING A HEIGHT GREATER THAN ITS FRONT SURFACE WIDTH, A FIRST LEG WITH A CUT-OUT FOR COOLING AIR, AND A SECOND LEG WITH NON-ALIGNED ENDS

BACKGROUND OF THE INVENTION

1. Field of the Invention

This invention relates to a data processing apparatus such as an office processor for performing, for example, cutform/document processing in office work.

2. Description of the Related Art

Nowadays, as the quality of living and office environments have been improved, offices are on the shift to the following new layout forms. The daily necessaries department of the Ministry of International Trade and Industry defines the new office as "place of living of human", "place of nucleus of computerization", "place of discovery of corporation culture" and "place of front line of internationalization" in a publication entitled "On the Guideline of Office Automation" and issued April 1988. As suggested by this guideline, a subject of modern office planning is to provide the place of functional and comfortable living such that creativity can be brought out and that office work can be performed efficiently. Particularly in forming comfortable offices, effective use of space is needed.

Heretofore, regarding a data processing apparatus/computer system such as an office processor for supporting conventional business document processing, a processing performance/function oriented improvement of office work productivity has been considered for top priority.

In general, a desktop data processing apparatus comprises a body in which a central processing unit, a memory, a magnetic disk unit, etc. are accommodated, as well as a CRT display, and a keyboard. Many of this kind of conventional data processing apparatuses are used basically with its body placed in a horizontal posture. Therefore, a box accommodating the body is in the shape of a rectangular parallelopipedon in which the height is less than the width and depth. In use, the computer body, the CRT display and the keyboard are all placed on a desk; alternatively, the CRT display is placed on the body, and the keyboard is disposed in front of the body.

In the former case, because the body having a large bottom surface area is disposed solely on the desk, the data processing apparatus necessarily occupies such a large area on the disk, thus resulting in a waste of space.

In the latter case, because the CRT display is placed on the body, space can be saved by providing an area corresponding to the bottom area of the CRT display; but, because the area of the bottom of the body occupies on the desk is yet considerably large, it also results in a waste of space. Further, since the CRT display is disposed on the body and hence the display screen is disposed far from the desk surface, the operator must move his or her eyes through a large angle to see the text or material on the desk and the display screen while inputting data such as characters, which can be a serial of eye strain. In addition, if the magnetic disk unit is a floppy disk unit, the loading position of a floppy disk is usually located on a front surface of the body. With this arrangement, loading and unloading of a floppy disk should be performed over the keyboard so that the operator's hand tends to inadvertently contact a key or keys of the keyboard during the loading or unloading, thus causing an inadvertent data entry.

Alternatively, the body may be placed on the desk in a vertical posture. However, the body should be placed on the desk basically in a horizontal posture, and it would be unstable and would tend to fall down if it is placed in a vertical posture.

Further, in this kind of data processing apparatus, a heat-exhaust fan is mounted on the rear surface of the box. Therefore, hot air exhausted from the heat-exhaust fan would be blown directly over a person standing or sitting behind the body, thus giving him or her an unpleasant feeling. The same thing can be said if the body is placed in a vertical posture; since the body should be placed on the desk basically in a horizontal posture, a prospective side surface is devoid of design, spoiling the appearance of an office. In addition, this kind of data processing apparatus is occasionally placed alongside an office file binder. However, the conventional data processing apparatus has not such a shape as to be juxtaposed with another office tool, particularly with a file binder; therefore, placing on the desk the apparatus together with the file binder would appear to be inappropriate for the office environment.

Furthermore, the box of the conventional data processing apparatus is previously provided with a space for accommodating an additional printed circuit board or the like when expansion is needed. This would necessarily increase the box in size by such a space, which is useless to the user who does not intend to make the expansion. After the space has been filled with the additional printed boards or the like, no expansion can be made, thus restricting the expansion feature. In this case, a plurality of identical boxes could be used. However, in the conventional data processing apparatus, placing a plurality of identical bodies on the desk is not considered to be practical, and interconnecting these identical bodies also is not considered to be practical. Consequently, a plurality of bodies would tend to be arranged on the desk in a disorderly fashion, and many cables would be needed to interconnect these bodies, thus requiring a large space on and behind the desk for the cables and hence spoiling the appearance of the office. Alternatively, an expansion unit may be encased in a separate box. In this case, the appearances of the boxes are not systematically designed, thus providing the same aesthetic problem. In addition, interconnecting the bodies by many cables elongates signal transmitting paths. Furthermore, these cables must be bound.

In the conventional data processing apparatus, effective use of office space and keeping an office environment tidy have not been considered. So the conventional data processing apparatus has a problem to be solved for constructing a comfortable new and aesthetically pleasing office environment.

SUMMARY OF THE INVENTION

A first object of this invention is to provide a data processing apparatus which is adapted to be placed on a desk basically in a vertical posture to save space, thus creating effective use of office space.

A second object of the invention is to provide a data processing apparatus which keeps an office environment tidy without deteriorating the performance thereof, and which is suitable when a new office environment is to be constructed.

A third object of the invention is to provide a data processing apparatus in which additional boxes similar to that of the body can be used for expansion so that signals can be transmitted through short cables and in which these boxes can be arranged on a desk in an orderly fashion in appropriate manner for an office environment.

The first object of the invention can be accomplished by a data processing apparatus comprising: a disk unit; a power supply unit; at least one first printed circuit board; a heat-exhaust fan; and a box accommodating the disk unit, the power supply unit, the first printed circuit board and the heat-exhaust fan. The box has a depth and a height which are both larger than its width. The box also has first and second sides defined by the depth and the height, bottom and top sides defined by the depth and the width, and front and rear sides defined by the height and the width. The disk unit and the power supply unit are disposed adjacent to the first side of the box, the first printed circuit board being disposed adjacent to the second side, the disk unit being disposed on the front side, the power supply unit being disposed on the rear side.

The disk unit should preferably include a storage-medium-non-exchange-type disk unit and a storage-medium-exchangeable disk unit, the storage-medium-non-exchange-type disk unit being disposed under the storage-medium-exchangeable disk unit. The storage-medium-non-exchange-type disk unit may include a hard disk unit using a magnetic storage medium, and the storage-medium-exchangeable disk unit may include a floppy disk unit or an optical disk unit.

The box may be similar in shape to an office file binder to be placed on a desk so that the area of installation can be minimized and that the box can be arranged contiguously to an office file binder, in an appropriate manner for an office environment while also being visually pleasing to a user. In this manner, a plurality of the boxes can be arranged on a desk without disrupting the aesthetic features of the office environment.

Further, if the disk and power source units and the printed circuit board are distributed to opposite sides within the box, the weight is balanced and the stability is improved. Especially if the hard disk unit, which is heavy, is located at the lower portion within the box, it is possible to increase the stability of the apparatus.

Additionally, if the depth and height of the body are smaller than those of a CRT display and if the keyboard is accommodated under the CRT display, it is possible to minimize the area of installation, creating effective use of office space.

The printed circuit board may have memory elements as well as a CPU. The memory elements may be mounted on a separate printed circuit board dedicated to the memory elements. In this case, the printed circuit board (master board) may be reduced in size.

The second object of the invention can be accomplished by attaching the heat-exhaust fan to the bottom side of the box for blowing air from the box to the external space.

Preferably, the box has in its top portion an inlet through which air is to be introduced into the box. Also preferably, the printed circuit board carrying the memory elements may be located upwardly of the storage-medium-exchangeable-type disk unit for effective cooling.

Further, the box may have first and second legs detachably mounted on the bottom surface at front and rear portions thereof, respectively. The first leg may have a load bearing portion bearing a partial load of the front surface and the first and second surfaces, all perpendicular to a surface to which the legs are attached. The first leg may have a rearwardly opening hollow portion disposed inwardly of the load bearing portion.

With this arrangement, since heat-exhaust air is not blown out directly from the rear side of the box, the user is spared any discomfort caused by the flow of air from the box.

Also, the heat-exhaust fan may be mounted on the bottom surface at such a position as to face the hollow portion, so that exhaust heat of air blown from the bottom side of the box can be prevented from being applied over a user standing in front of the apparatus. Since the outlet is covered by the first leg, sound created by the fan can be silenced.

The third object of the invention can be accomplished by providing the apparatus with an additional box identical in size with the first-named box, the additional box accommodating an expansion device and being operatively connected to the first-named box via a bus.

Preferably, the first-named box has in a front portion of the second side surface an opening through which the bus extends, and the additional box having on its front surface a bus connector in which a leading end of the bus is to be inserted for connection therewith.

With this arrangement, expansion is possible by using the additional box identical in shape with the body, and signals can be transmitted through short cables. Further, the plural boxes can be arranged on a desk neatly in a manner appropriate for an office environment. The boxes can be interconnected by a relatively small number of cables, as compared to the conventional apparatus, thus deteriorating the landscape of the office.

According to this invention, the following advantageous results can be expected:

(1) It is possible to reduce the apparatus into a compact size, to increase the stability even when the body is placed on a desk in a vertical posture, and to realize effective cooling thereof.

(2) The body can be placed also in a horizontal posture, without deteriorating the operativity.

(3) It is possible to maintain an appropriate and aesthetically pleasing office environment and to eliminate any discomfort due to hot air and noises from the heat-exhaust fan.

(4) Since the box or boxes are arranged on a desk like file binders, a dignified office environment can be maintained.

(5) Because the plural boxes are operatively interconnected via a bus, signals can be transmitted through short path, without spoiling the beauty of office environment. Therefore this invention can contribute an effective use of office space and a comfortable office environment.

DETAILED DESCRIPTION OF THE INVENTION

Figure 1:
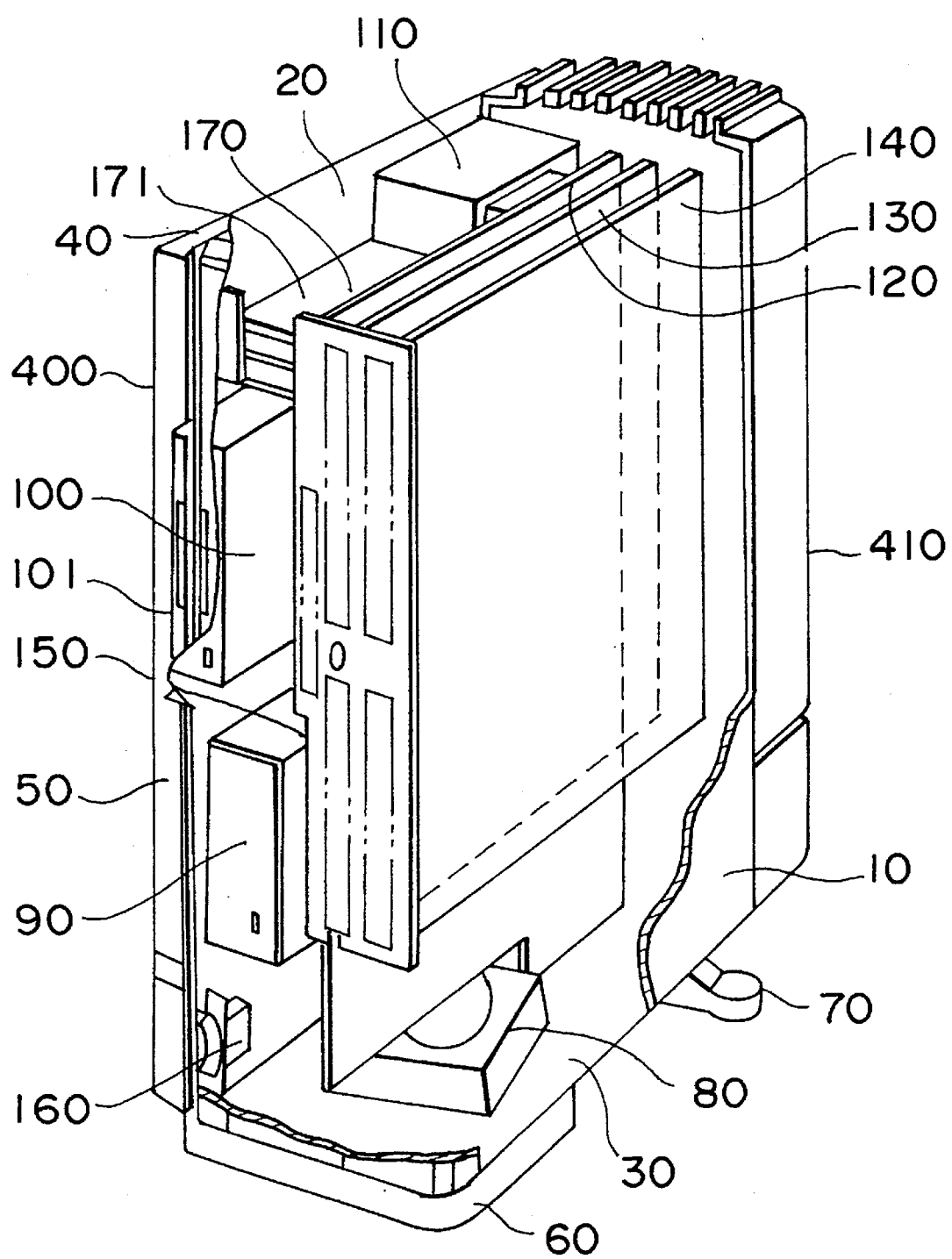
FIGS. 1 and 2 are perspective views, with parts broken away, of a body of a data processing apparatus embodying this invention.

The principles of this invention are particularly useful when embodied in a data processing apparatus (hereinafter called "apparatus"), e.g., a box of an office processor, such as shown in FIG. 1. The apparatus is of a small desktop type, 130 mm wide, 355 mm deep and 365 mm high.

Figure 2:
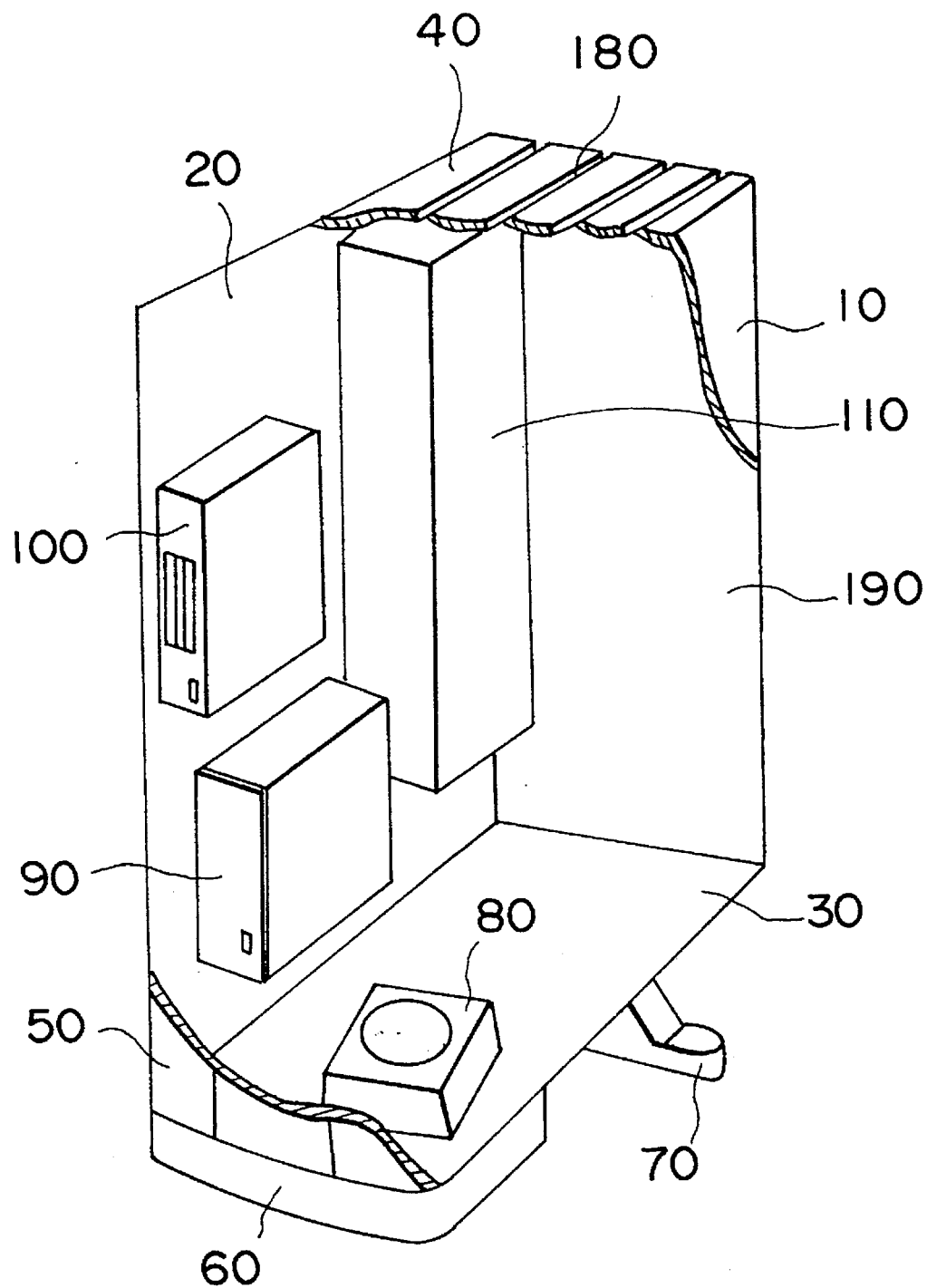
Figure 4:
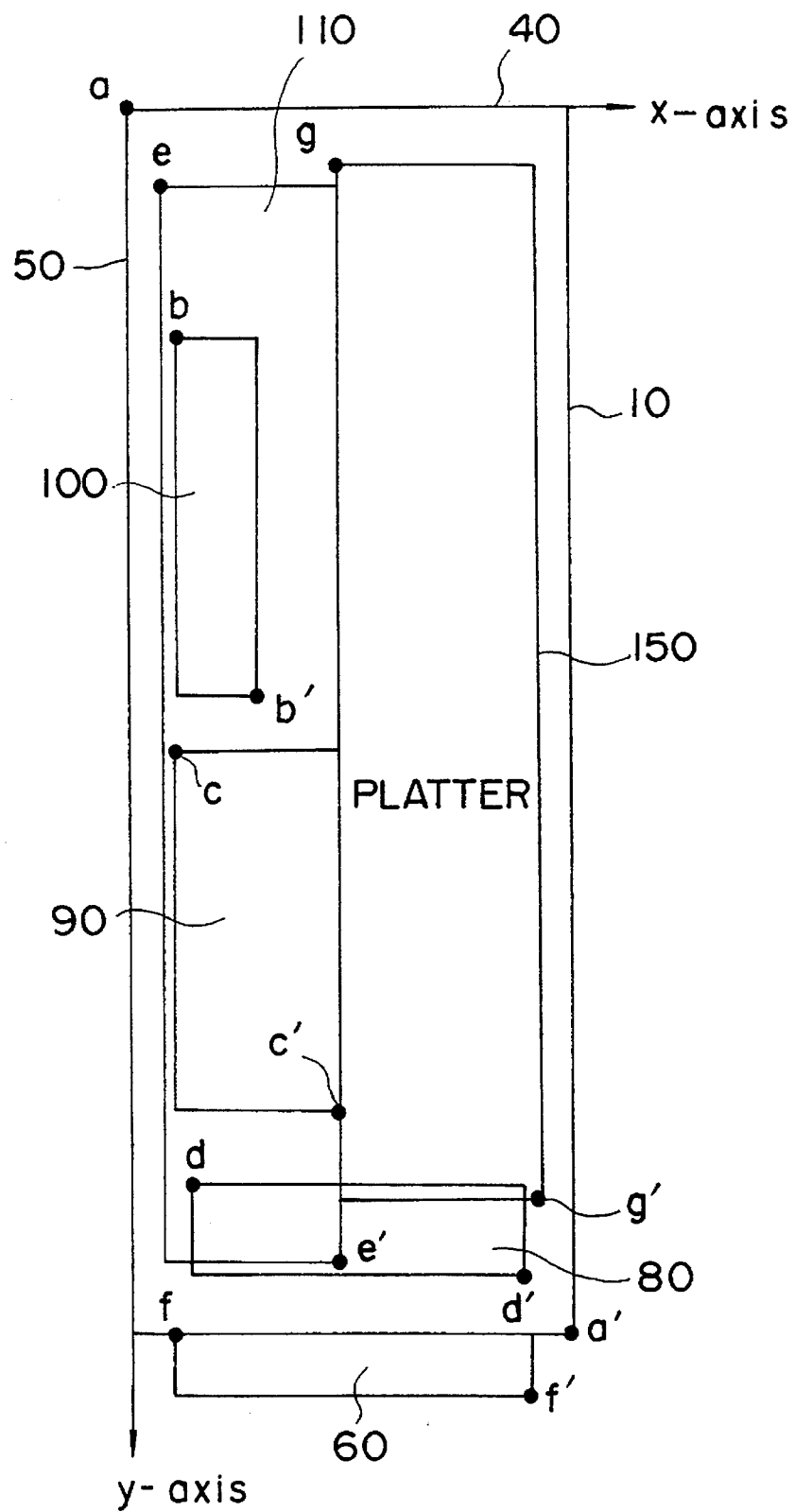

In FIG. 1, a reference numeral 400 designates a box and 410 a cable housing. The cable housing 410 is not shown in the remaining figures. Reference numerals 10 and 20 designate opposite side surfaces of the box; 30, a bottom surface of the box; 40, a top surface of the box; 50, a front surface of the box; 60 and 70, legs for placing the apparatus on a desk or table; 80, a heat-exhaust fan for blowing hot air in the box to outside of the box; 90, a first disk unit comprising a 3.5-inch storage-non-exchange-type magnetic disk (hard disk) unit; 100, a second disk unit comprising a 3.5-inch storage-exchangeable-type floppy disk unit; 110, a power supply unit; 120, 130 and 140, printed circuit boards (a master board and option boards); 150, a platter; 160, a power switch; 170, a memory board connected to the master board 120 such as by a connector; and 180, an inlet through which air is to be introduced into the box for cooling. The inlet 180 is denoted only for indicating the position of the inlet in FIG. 1. The configuration of the inlet is shown in FIGS. 2 and 4. The notation of the inlet 180 is omitted in the remaining figures for simplicity.

The printed circuit boards 120, 130, 140 carry thereon semiconductor elements. Particularly on the printed circuit board 120 which is a master board, integrated circuit elements constituting a CPU or the like are carried.

The memory board 170 is composed of a group of memory elements mounted on a printed circuit board. One or more memory boards, three memory boards in FIG. 1, are employed. The memory boards are disposed perpendicularly to the printed circuit board 120 in the embodiment as illustrated in FIG. 1. Alternatively, they may be disposed diagonally to the circuit board 120.

As shown in FIG. 1, the interior of the apparatus box is constructed by the components in the following manner:

(1) Weight Distribution (Balance) and Compact Package

The heat-exhaust fan 80, the magnetic disk unit 90, the floppy disk 100, the power supply unit 110 and the printed circuit boards 120, 130, 140, which occupy a substantial portion of the weight of the apparatus, are arranged in the following manner:

(a) For widthwise balance, the magnetic disk unit 90, the floppy disk unit 100 and the power supply unit 110 are arranged on the leftside in the box, and the printed circuit boards 120, 130, 140 are arranged on the rightside in the box.

(b) For vertical balance, the magnetic disk unit 90, which is heavy as opposed to the floppy disk unit 100, is located downwardly of the floppy disk unit 100, and the heat-exhaust fan 80 is mounted on the bottom surface 30.

(c) On the side surface 20, for depthwise balance and operability of the floppy disk, the magnetic disk unit 90 and the floppy disk unit 100 are located at the front portion (front surface 50), and the power supply unit 110 is located at the rear portion in a vertical posture. Thus the floppy disk unit 100 has in its front surface a load slit 101 through which a floppy disk is to be loaded and unloaded.

(d) As discussed above, the basic interior structure of the apparatus is a double-layer structure. Specifically, the space defined between the opposite side surfaces is figuratively divided into two layers; the printed circuit boards 120, 130, 140 are included in one layer (hereinafter called "second layer"), while the remaining parts (the magnetic disk unit 90, the floppy disk unit 100 and the power supply unit 110) are included in the other layer (hereinafter called "first layer").

These individual layers are only imaginary, and a portion of one of the parts disposed in one layer may project into the other layer. A unit or device, e.g. the heat-exhaust fan 80, may extend between the first and second layers.

The master board 120 is located in the second layer at a position proximate to the first layer. This arrangement is particularly desirable in regard to the power supply and connection to the the magnetic disk unit 90 and the floppy disk unit 100.

(2) High-efficient Cooling

In general, the apparatus which realizes high-speed/high-performance processing by using semiconductor devices such as of a CPU would often produce heat in the power supply unit 110 and the printed circuit boards 120, 130, 140 which carry semiconductor devices thereon. Therefore the heat-exhaust fan 80 and the inlet 180 through which air is to be introduced for cooling are provided. In order to improve the cooling efficiency, the heat-exhaust fan 80 and the outlet 180 are arranged in relation with the remaining units or devices in the following manner:

(a) The inlet 180 is formed in the top surface 40 of the box. The heat-exhaust fan 80 is placed on the bottom surface 30.

(b) The interior units or devices are mounted in the box in such an arrangement that a major portion of cool air flows over the power supply unit 110 and the printed circuit boards 120, 130, 140, which produce much heat, to provide a positive cooling thereto. For example, a guide member is mounted in association with the printed circuit board 120, perpendicularly thereto, at a space above the floppy disk unit 100 and the magnetic disk unit 90 which produce less heat, other than the area where the power supply unit 110, which produces much heat, exists. This guide member serves to direct the flow of cooling air toward the printed circuit boards 120, 130, 140. In the embodiment as illustrated in FIG. 1, the memory boards 170 are used as a guide member.

Specifically, in the space where the floppy disk unit 100 and the magnetic disk unit 90 exist, a portion of the air flow path directing the bottom surface is blocked up by the memory boards 170, especially an uppermost memory board 171. In the space where the printed circuit boards 120, 130, 140 exist, since these printed circuit boards are arranged at intervals of a suitable distance and substantially in parallel to the side surface 10, the air flow path toward the bottom surface is secured. Therefore, most of the air flowing into the interior of the apparatus via the inlet 180 is directed towards the space where the printed circuit boards 120, 130, 140 exist, but not toward the space where the floppy disk unit 100 and the magnetic disk unit 90 are disposed, as guided by the memory board 171.

Figure 20:
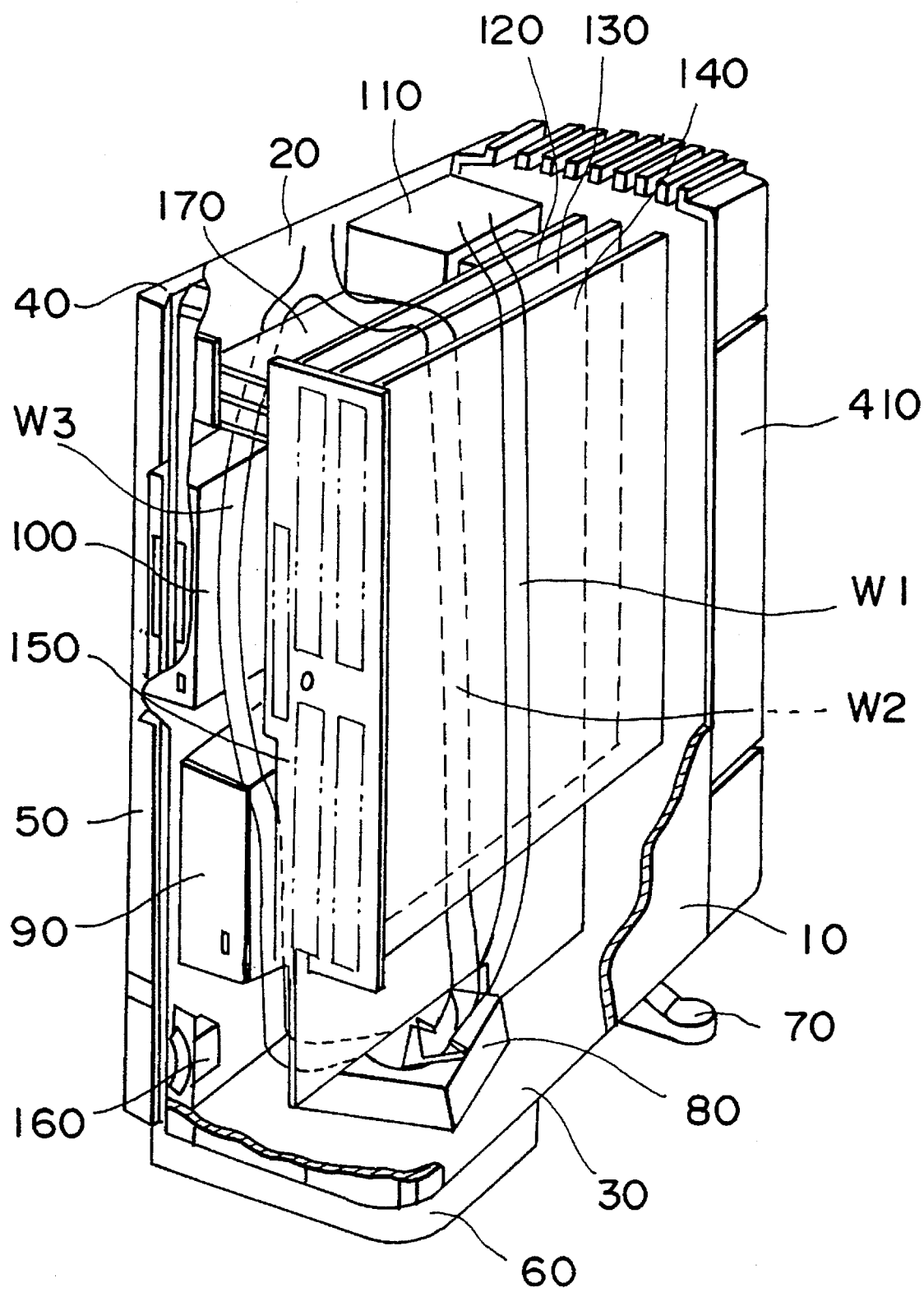
FIG. 20 is an explanatory view showing a cooling effect according to the present invention.

On the other hand, another portion of the air introduced into the interior of the apparatus flows downward to the fan 80 through a gap between a tip end of the memory boards 170 and the side surface 20, while cooling the floppy disk unit 100, the hard disk unit 90 and the master board 120. Thus, most of the air introduced through the inlet 180 is guided by the printed circuit board 171 to the space where the printed circuit boards 120, 130 and 140 are disposed, forming air streams of W1 and W2 (see FIG. 20).

Since the units or devices, which produce much heat, are cooled preponderantly in the present embodiment, the entire apparatus can be cooled efficiently. Also in a construction without the memory boards 170, the floppy disk unit 100 and the magnetic disk unit 90, which are both in the form of a box, serve as an air guide, so that the cooling efficiency as described above can be maintained.

The memory boards 170 mounted in the manner as described above would provide a high cooling efficiency and an effective utilization of the space in the box, improving the packaging efficiency and enhancing the reduction of size thereof. Generally, the size of the box depends on an area of the master board, so that the memory elements, which occupy a considerable area to be mounted, are disposed on a board other than the master board which is arranged at an angle with the master board. As a result of this, the area of the master board may be greatly reduced.

The inlet 180 may be formed at an upper portion of the rear surface of the box instead of being formed on the top surface of the box.

Another printed circuit board carrying thereon circuit elements other than the memory elements may alternatively be used as a guide member.

(3) Office Environment

When the apparatus is placed on a desk or floor, legs are needed. In this embodiment, for the following reasons, the shapes of the front and rear legs 60, 70 are determined, depending on the respective purposes.

(a) Since the heat-exhaust fan 80 blows hot air in the box outside of the box, the hot air is toward a user, creating much discomfort. The noise produced from the fan 80 also creates discomfort. Therefore, in the apparatus, the shape of the leg 60 is designed so as to block the hot air and noise from the bottom surface 30. More specifically, the leg 60 has portions for bearing the weight of the apparatus, supporting end portions of the front and side surfaces 50, 10, 20. Also, the leg 60 has a hollow portion 809b (FIGS. 13 and 14A), inside the load bearing portions, opening at least rearwardly (denoted by 809a in FIGS. 13 and 14a). An opening 30a on the bottom surface 30, where the fan 80 is mounted, may preferably be formed at a position corresponding to the hollow portion 809b. This location allows the hot air and noise from the fan 80 to be directed towards the rear of the box.

In view of the amount of heat-exhaust air blown out from the fan 80, the leg 60 may have in the opposite surfaces 10, 20 cutouts communicating the hollow portion with the outside of the box.

(b) Because the apparatus is basically intended to be placed in a vertical posture, namely a standing position, it is particularly necessary to maintain a stability in the vertical, standing posture. For this purpose, the rear leg 70 has a horizontally extending shape to prevent the box from falling down.

(4) Forms of Installation

The apparatus is adapted to be placed in a horizontally lying posture as well as in a vertical standing posture. For this purpose, the following considerations were made:

(a) In this apparatus, cooling air is drawn into the apparatus through the top surface 40, flows through the interior of the apparatus toward the bottom surface 30 and is then blown out to the exterior by the heat-exhaust fan 80 located on the bottom surface 30. Therefore, it is necessary to provide a gap between the top surface of a desk and the bottom surface 30 of the apparatus. In general, legs are used to secure this gap. However, a user would occasionally place the apparatus directly on the desk without using legs. In this case, the desired air flow would be blocked up, causing troubles for the apparatus due to heat. In this embodiment as illustrated, each of the bottom surface 405 and the top surface 404 (FIG. 15) has a rounded shape, so that a user should attach legs to the apparatus because the apparatus cannot stand unless the legs are attached in the vertical posture. The rounded shape of the top surface also enhances the aesthetic effect of the apparatus.

(b) For preparation for expansion of the system, the apparatus is designed to have such a shape that it may be arranged with another unit for expansion with their front surfaces being flush with each other. A plurality of apparatuses or units may be operatively interconnected via a bus by using a flexible printed circuit board (FPC) on their front side.

(c) The position for mounting the floppy disk is so selected that the center of the installation position of the floppy disk is located upwardly of a vertical center of a screen of the CRT display. In this case, the condition of the disk unit can be seen apparently to know whether the floppy disk is being accessed or not. A lamp for indicating a power switch is turned on or off is located downwardly of the upper end of the screen of the CRT display.

(d) The box, the CRT display and the keyboard have respective structures such that the total area of installation will be minimal.

(e) The legs 60, 70 are detachable from the apparatus. Therefore, when the apparatus is required to be placed in a horizontal posture, the legs 60, 70 are removed, projecting no legs laterally. Otherwise, the aesthetic features of the desk or the office would be spoiled. It is also possible to prevent the box from being inclined by the leg 70 projecting from the side surfaces.

(f) Although not illustrated in the drawings, a pad may be attached to the side surface of the box for the horizontal installation. Given that a pad is attached to the side surface 10, it is possible to preliminarily suggest to a user that the side surface 10 in the vertical installation is a prospective bottom surface in the horizontal installation. This arrangement will necessarily result in that the operating surfaces of the floppy disk unit 100 are located at the upper and rightside positions. Therefore, it can be prevented that the user's hand would inadvertently contact the keyboard when the floppy disk is loaded or unloaded, thus preventing a possible misoperation and hence improving the operativity.

Figure 3:
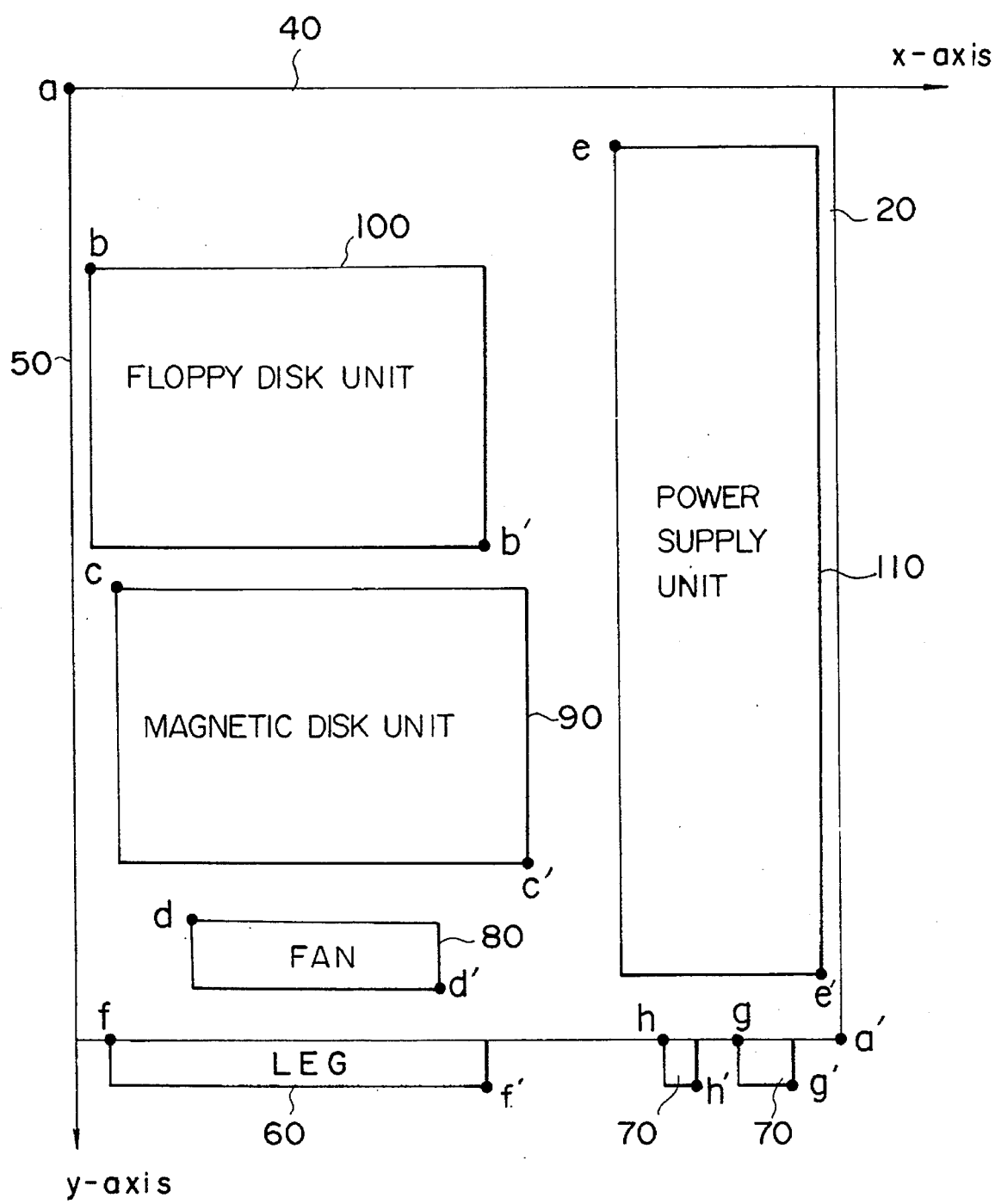
FIGS. 3 and 4 are diagrams each showing arrangement of parts of the apparatus.

With reference to FIGS. 2 and 3, the positional relationship of the legs 60, 70, the heat-exhaust fan 80, the magnetic disk unit 90, the floppy disk unit 100 and the power supply unit 110 will now be described. FIG. 2 shows the package structure of the apparatus similar to that of FIG. 1, with the printed circuit boards 120, 130, 140, the platter 150, the power switch 160 and the memory board 170 being omitted. FIG. 3 shows the positional relationship between the individual units arranged on the side surface 20 of the box.

As shown in FIG. 2, the magnetic disk unit 90 is located at the lower portion of the box along the side surface 20 and the power supply unit 110 is located to the rear of the magnetic disk unit 90 and extends vertically. In FIG. 2, 190 designates a rear surface of the box of the apparatus body.

In FIG. 3, a, a', b, b', c, c', d, d', e, e', f, f', g, g', h and h' designate points on x-coordnate component and y-coordinate component, with the point a of the side surface 20 as the origin (0, 0), indicating the location and size of the individual unit or device. Each figure in parentheses is a coordinate value in the unit of mm.

At the side surface 20, i.e. a point (0, 0), b point (281, 345), the location and size of the individual element or unit are as follows.

The floppy disk unit 100: b point (8, 66.4), b' point (153, 168).

The magnetic disk unit 90: c point (18, 181.4), c' point (168, 283).

The heat-exhaust fan 80: d point (42.7, 303), d' point (135.4, 328).

The power supply unit 110: e point (202,21), e' point (277, 323).

The leg 60: f point (10.2, 345), f' point (152.9, 362.5).

The leg 70: g point (244.6, 345), g' point (266.6, 362.5) and h point (219.6, 345), h' point (231.6, 362.5).

The shapes of the individual units or devices are as follows. The details of the legs 60, 70 will be described later, referring to FIGS. 14A and 14B.

The floppy disk unit 100: 101.6 mm wide×145 mm deep×25.4 mm high.

The magnetic disk unit 90: 101.6 mm wide×150 mm deep×42 mm high.

The heat-exhaust fan 80: 80 mm wide×25 mm deep×80 mm high.

The power supply unit 110: 303 mm wide×75 mm deep× 45 mm high.

The arrangement of the individual elements or units (the leg 60, the heat-exhaust fan 80, the magnetic disk unit 90, the floppy disk unit 100, the power supply unit 110 and the platter 150) as viewed from the front surface 50 will now be described, while referring to FIG. 4. In FIG. 4, a, a', b, b', c, c', d, d', e, e', f, f' and g, g' designate points on x-coordinate component and y-coordinate component, with the point a of the side surface 20 as the origin (0, 0), indicating the location and size of the individual unit or device. Each figure in parentheses is a coordinate value in the unit of mm.

At the front surface 50, i.e. a point (0, 0), a' point (127, 345), the location and size of the individual element or unit are as follows.

The floppy disk unit 100: b point (13, 66.4), b' point (38.4, 168).

The magnetic disk unit 90: c point (12.5, 181.4), c' point (54.5, 283).

The heat-exhaust fan 80: d point (18.5, 303), d' point (111.1, 328).

The power supply unit 110: e point (11, 21), e' point (56, 324).

The leg 60: f point (11.5, 345), f' point (115.5, 362.5).

The platter 150: g point (56, 18), g' point (118, 308).

The shapes of the master board 120, the option boards 130, 140 and the memory board 170 as well as the hardware which is carried on the master board 120 determining the processing function of the apparatus will now be described, referring to FIGS. 5, 6, 7 and 11.

Figure 5:
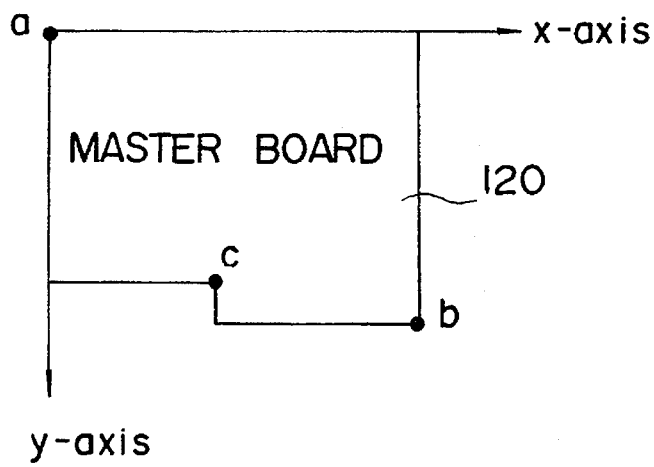
FIG. 5 is a diagram showing the shape of a master board.

The shape of the master board 120 shown in FIG. 5 is indicated by b point (226, 300) and c point (99.5, 271) on x-coordinate component and y-coordinate component with a point being the origin (0, 0). A y-axis plane is a surface to be connected with the platter 150, and the unit of the coordinate position is mm.

Figure 6:
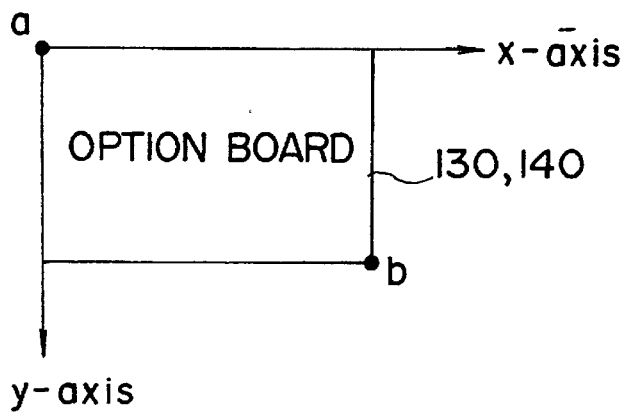
FIG. 6 is a diagram showing the shape of an option board.

The shape of each of the option boards 130, 140 shown in FIG. 6 is indicated by b point (226, 204.3) on the x-coordinate and y-coordinate with a point being the origin (0, 0). The y-axis plane is a surface to be connected with the platter 150, and the unit of coordinate position is mm.

Figure 7:
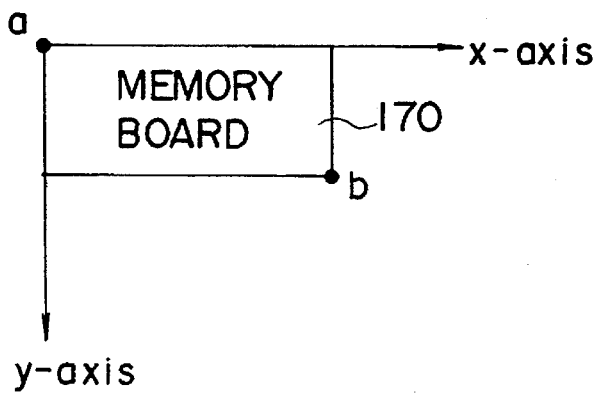
FIG. 7 is a diagram showing the shape of a memory board.
Figure 8C:
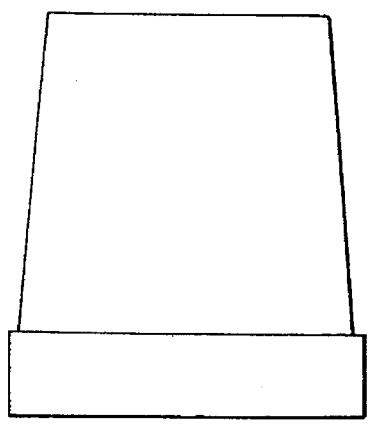
FIG. 8C is a top view of the CRT display.
Figure 8A:
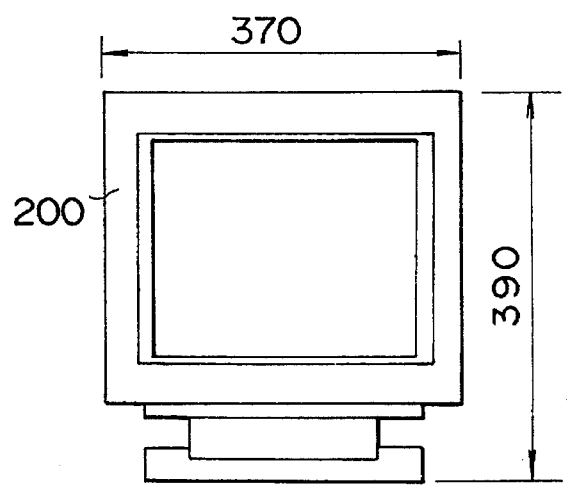
FIG. 8A is a front view of a CRT display preferably used in the embodiment.
Figure 8B:
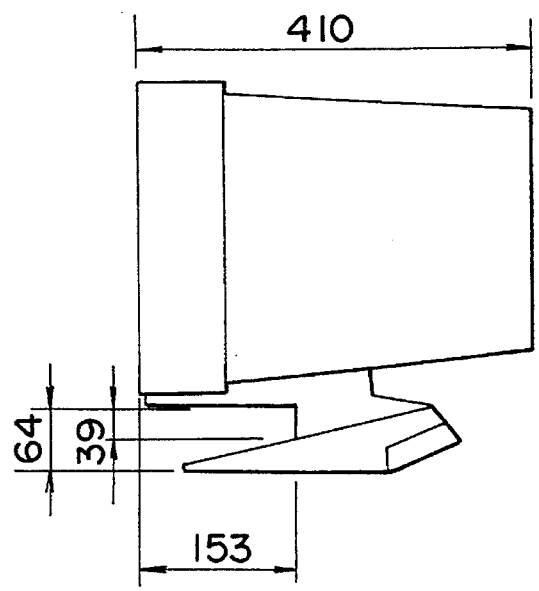
FIG. 8B is a side view of the CRT display.
Figure 9A:
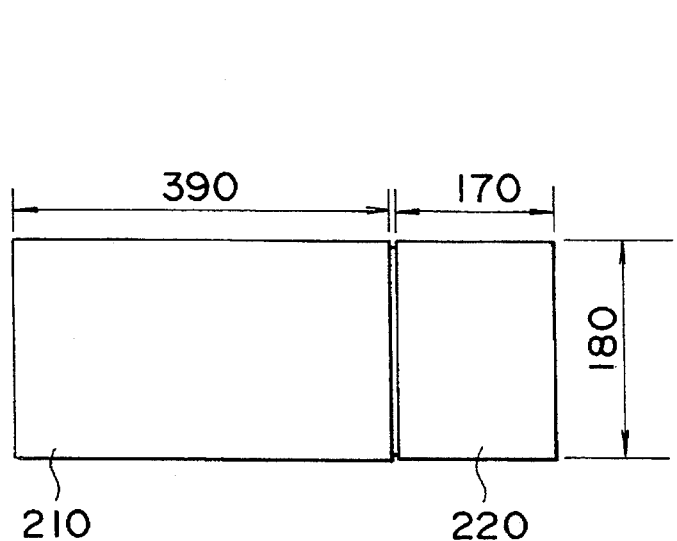
FIG. 9A is a top plan view of a keyboard preferably used in the embodiment.
Figure 9B:
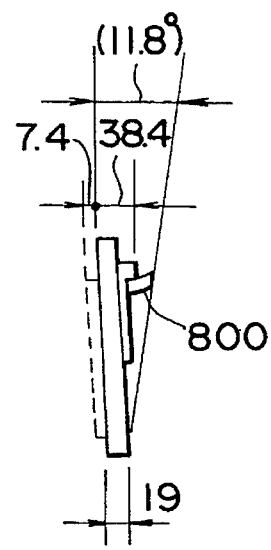
FIG. 9B is a side view of the keyboard.

The shape of the memory board 170 shown in FIG. 7 is indicated by b point (113, 48) on x-coordinate and y-coordinate with a point being the origin (0, 0). The x-axis plane is a surface to be connected with the master board 120 perpendicularly thereto and parallel to the bottom surface 30, and the unit of coordinate position is mm.

Figure 11:
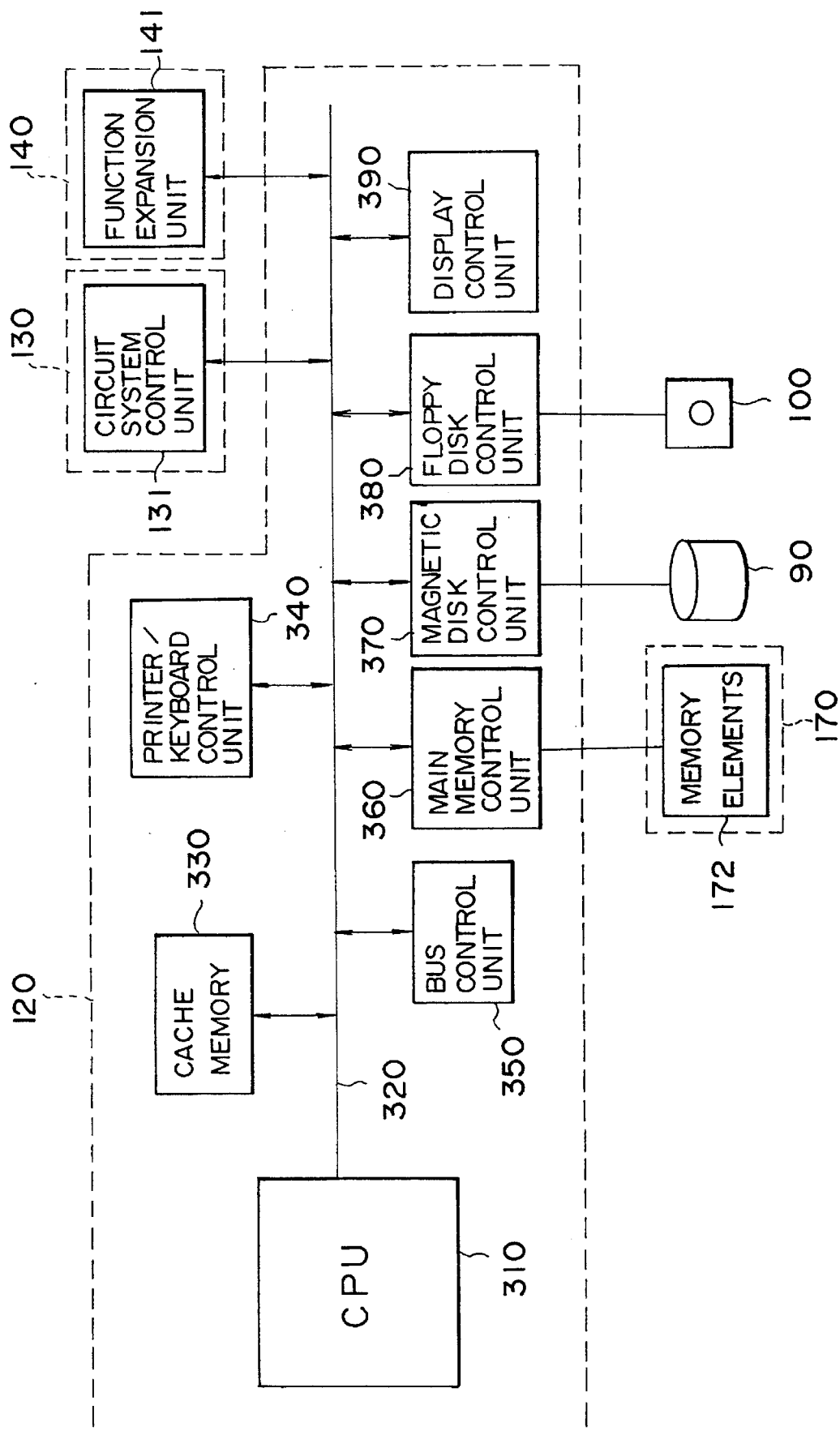
FIG. 11 is a block diagram of the entire system of the data processing apparatus.

FIG. 11 is a block diagram showing the hardware carried on the master board 120, determining the processing function of the apparatus.

In FIG. 11, reference numeral 310 designates a CPU (central processing unit); 320, a system bus; 330, a cache memory; 340, a control unit for a printer and a keyboard; 350, a bus control unit for controlling the system bus 320; 360, a main memory control unit; 370, a control unit for magnetic disk 90; 380, a control unit for floppy disk 100; and 390, a display control unit. All of these units are carried on the master board 120. A circuit system control unit 131, which is circuit hardware for interfacing an external network, is carried on the option board 130. A function expansion unit 141 for employment of additional apparatuses or expansion of functions such as connection of disply etc., is carried on the option board 140. A group of memory elements 172 constituting a main storage of the apparatus is carried on the memory board 170.

Figure 10:
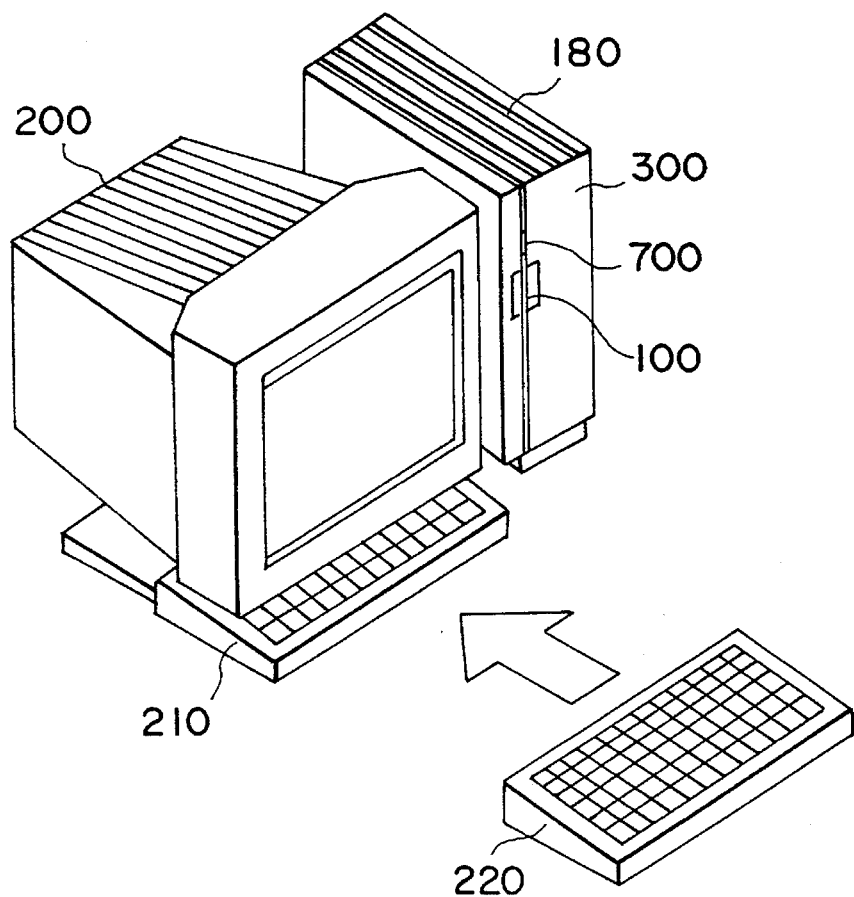
FIG. 10 is a perspective view of the entire system of the data processing apparatus.

In general, as shown in FIG. 10, the apparatus comprises, for machine interfacing, a CRT display 200, and a keyboard 210 with a ten key unit 220, in addition to the body, as shown in FIGS. 8A, 8B, 9A and 9B. For example, the shape of the CRT display 200 is 370 mm wide, 410 mm deep and 390 mm high. The keyboard 210 with the ten key unit 220 is 560 mm wide, 180 mm deep and 19 mm high (thick), the ten key unit 220 at the rightside of the keyboard 210 being 170 mm wide. Therefore, without the ten key unit 220, the keyboard 210 is 390 mm wide. Further, the CRT display 200 has on its underside (at a neck portion) a recess which is 153 mm deep and 64 mm high.

In the apparatus as described above, the sizes of the CRT display 200, the keyboard 210 and the apparatus body 300 are determined as follows, to make the physical configuration of the entire system compact as shown in FIG. 10.

(a) The ten key unit 220 is separated from the keyboard 210 at will, and then the keyboard 210 is nested in a recess under the CRT display 200.

(b) The body of the vertical desktop binder-shaped apparatus (130 mm wide, 355 mm deep and 365 mm high) is reduced in size to an office file binder size; specifically, at least the depth of the apparatus is reduced to 355 mm, smaller than the depth (410 mm) of the CRT display 200.

(c) The height of the apparatus is reduced to 365 mm, smaller than the height (390 mm) of the CRT display 200.

The expansion feature will now be described, referring to FIGS. 12, 13, 14A and 14B.

Figure 12:
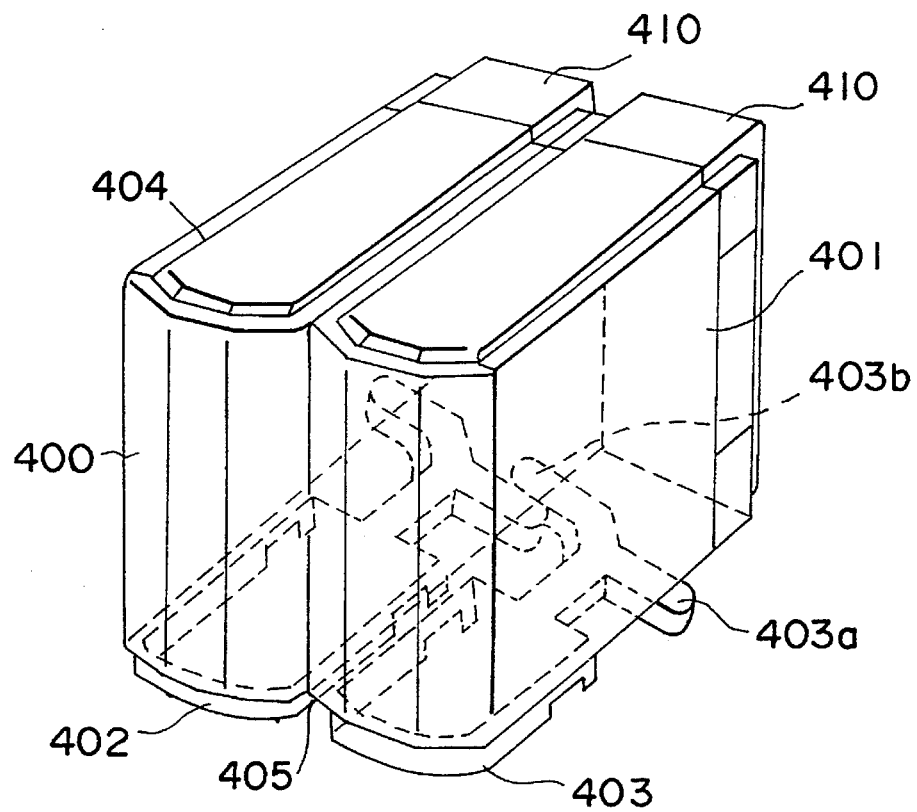
FIG. 12 is a perspective view showing a second embodiment in which an additional box is placed contiguously to a box of the apparatus body.
Figure 13:
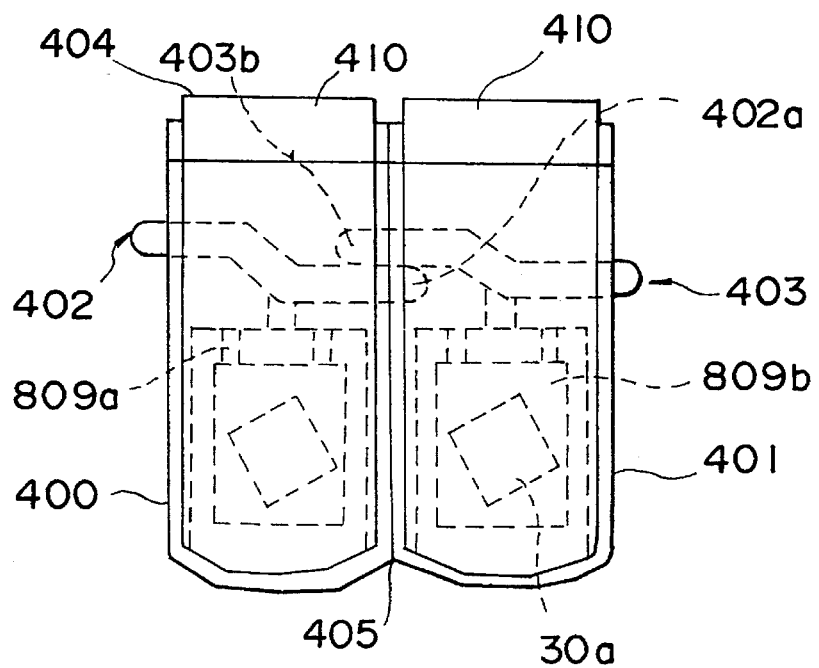
FIG. 13 is a top plan view of FIG. 12.

FIG. 12 is a perspective view of another embodiment in which two apparatuses are placed together, contiguously each other. FIG. 13 is a top plan view of the apparatuses shown in FIG. 12.

In FIGS. 12 and 13, reference numerals 400 and 401 designate boxes; and 402 and 403, legs. These two boxes 400, 401 are identical with each other at least in height and depth. In FIG. 13, the two boxes are substantially identical with each other in width, but may be different by necessity. The legs 402, 403 are identical in shape with each other. As the boxes 400, 401 are placed contiguously to each other, ends 402a, 403b of the boxes 400, 401 can enter and extend under the box 401, 400, respectively. Although the legs 402, 403 are of a reversed S-shape in the embodiment as illustrated in FIG. 13, they may be formed in an S-shape. In this case, the legs 402 and 403 function similarly.

The detailed structure of each of the legs 402, 403 will now be described.

Figure 14B:
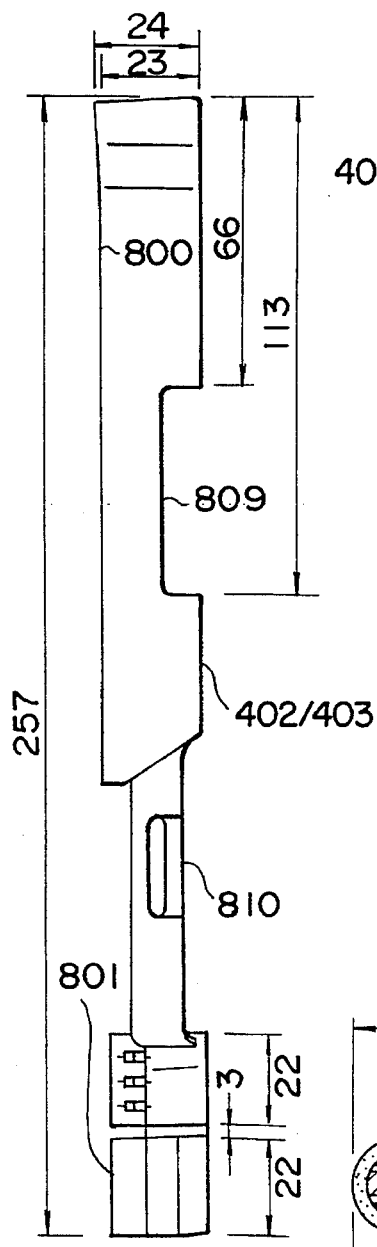
FIG. 14B is a side view of FIG. 14A.
Figure 14A:
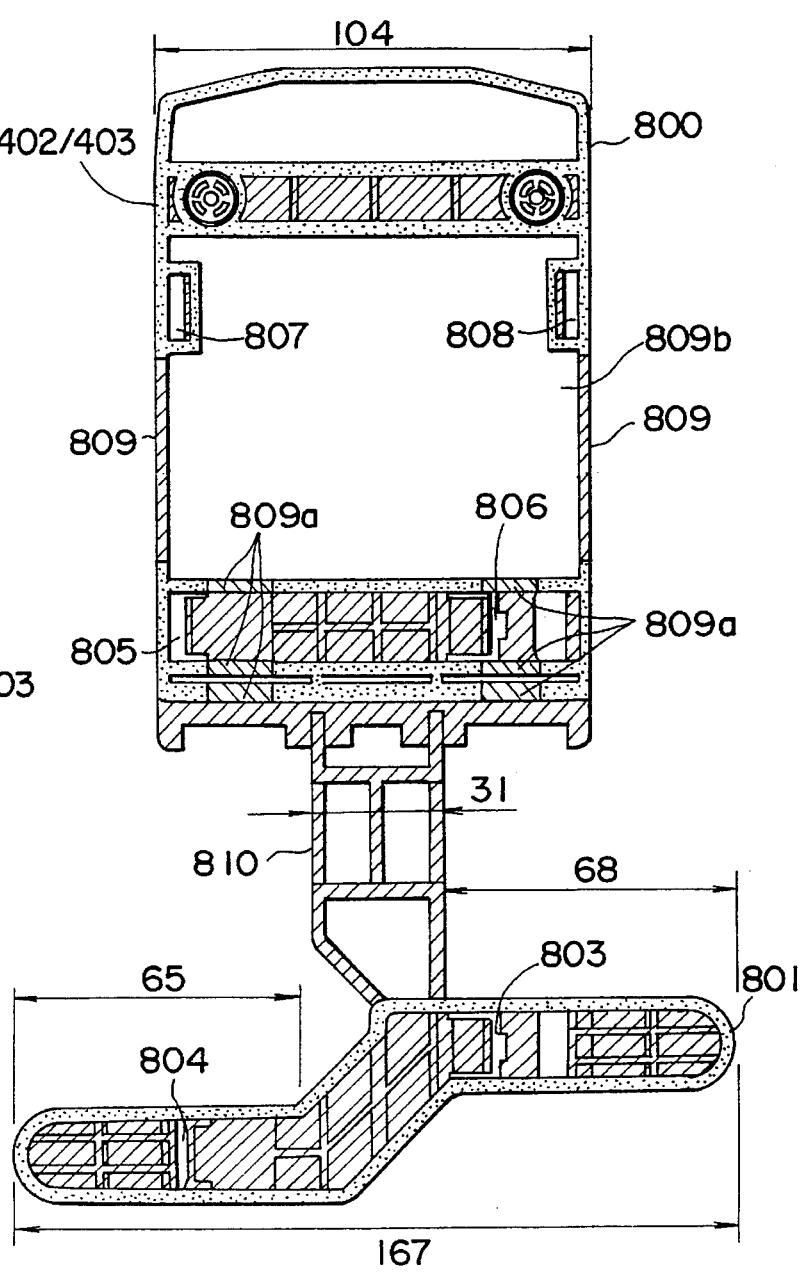
FIG. 14A is a bottom plan view schematically showing legs to be attached to the apparatus body.

FIGS. 14A and 14B are bottom and side views, respectively, showing the legs 402, 403 to be attached to the boxes 400, 401 when the boxes are placed in a vertical posture.

In FIGS. 14A and 14B, reference numeral 800 designates a detail of the leg 60; 801, a detail of the leg 70; 803 to 808, fastening receptacles; 809 and 809a are cutouts through which hot air from the heat-exhaust fan 80 is to be discharged; and 810, a connecting portion for joining the legs 800, 801 together.

In FIG. 14A, randomly dotted portions indicate portions which are engageable with the top surface of a desk when the apparatuses are placed on the desk. In this position, the remaining portions are spaced from the top surface of the desk. In FIGS. 14A and 14B, figures with headed arrows represent dimensions in the unit of mm.

In the embodiment of FIGS. 12 and 13, the two apparatuses are placed contiguously to each other on the desk. Each of the legs 402, 403 shown in FIGS. 14A and 14B is asymmetrical in a sideward direction for a purpose as will be described below.

(a) Each of the legs 402, 403 has a distal end projecting from the side surfaces of the box for stable installation.

(b) In the case of expansion or employment of additional units or apparatuses, it is desirable to place the adjacent boxes so tht the front surfaces of the boxes are flush with each other, while keeping the two boxes in contact along their respective adjacent side surfaces. For this purpose, the two projecting portions are staggered in the depthwise direction in order to engage with each other, while avoiding any obstruction, when the two boxes are placed closely each other. This depthwise positional difference between the two projecting portions serves as a guide or regulates the respective positions in the depthwise direction to put the front surfaces of the boxes in a flush arrangement.

The cutout 809a serves as an outlet to discharge the heat-exhaust air either when the single apparatus is installed or when a plurality of apparatuses are installed. The cutout 809 is formed in each box at a fixed position in the depthwise direction, so that when a plurality of boxes are juxtaposed to each other, the cutouts 809 of the respective boxes are aligned with each other. Thus, a path for discharging the hot air from the respective apparatuses is assured.

Figure 15:
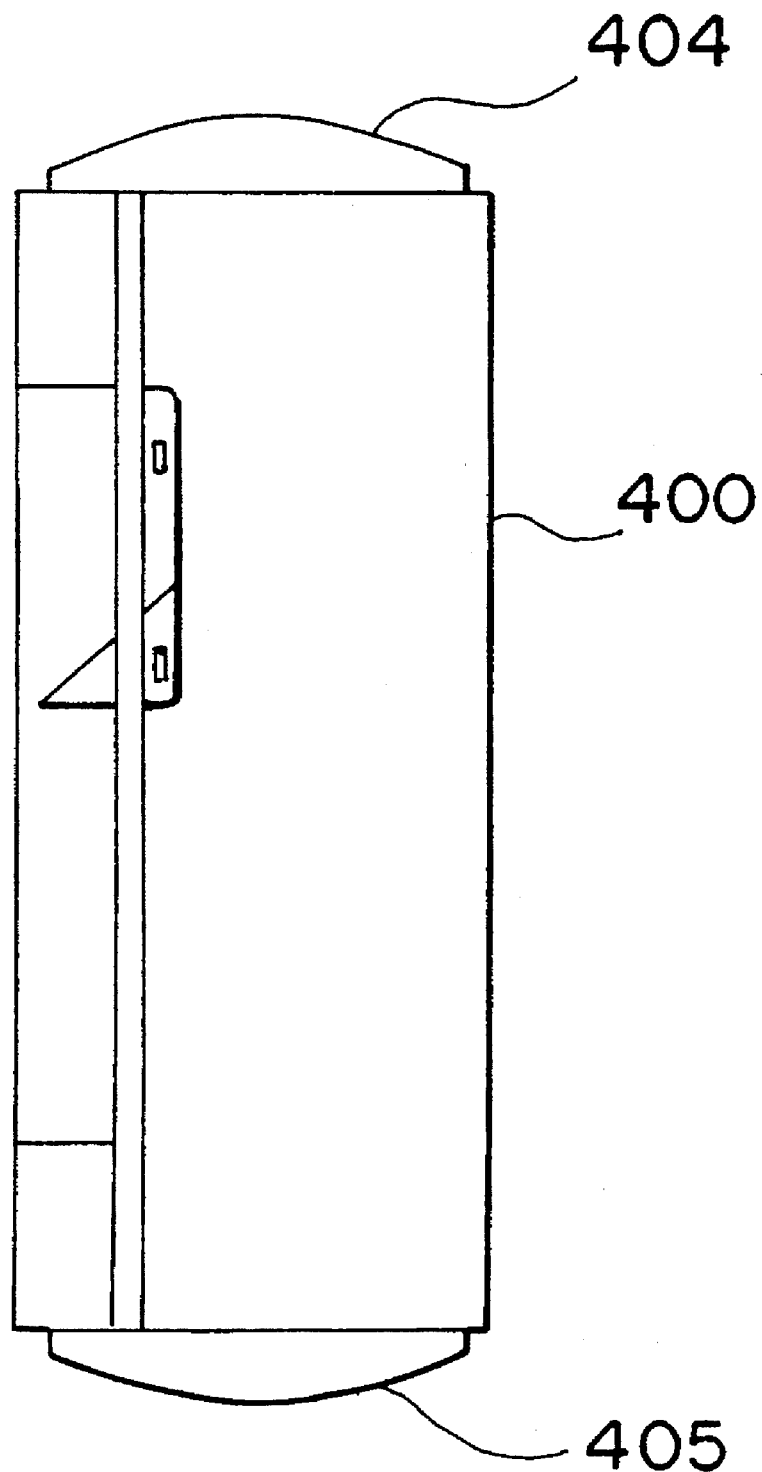
FIG. 15 is a front view of the box of the apparatus body.

The apparatus according to the present embodiment has a specific configuration for assuring the intended cooling operation. The configuration will now be described, referring to FIG. 15. FIG. 15 shows a front view of the box 400 of FIG. 12.

As can be seen from FIG. 15, the top surface 404 and the bottom surface 405 of the box are curved when viewed from the front side. The radius of a curvature of the curved surface is about 800 mm. Because of the curved surface, it is impossible to install the apparatus vertically with either of the top and bottom surfaces 404, 405 on the desk. For stable vertical installation, the leg 402 must be attached to the box 400. Thus, a path for discharging the hot air in the apparatus is secured and a trouble due to heat can be prevented.

Since the leg 402 is adapted to be attached only to the bottom surface, the apparatus can be installed in an expected vertical posture, namely, rightside up. On this assumption, the arrangement of the various units or elements in the box 400 are determined so that the center of the gravity is located at a lower side. Thus, the apparatus can stand stably when it is placed in the vertical posture.

Figure 16:
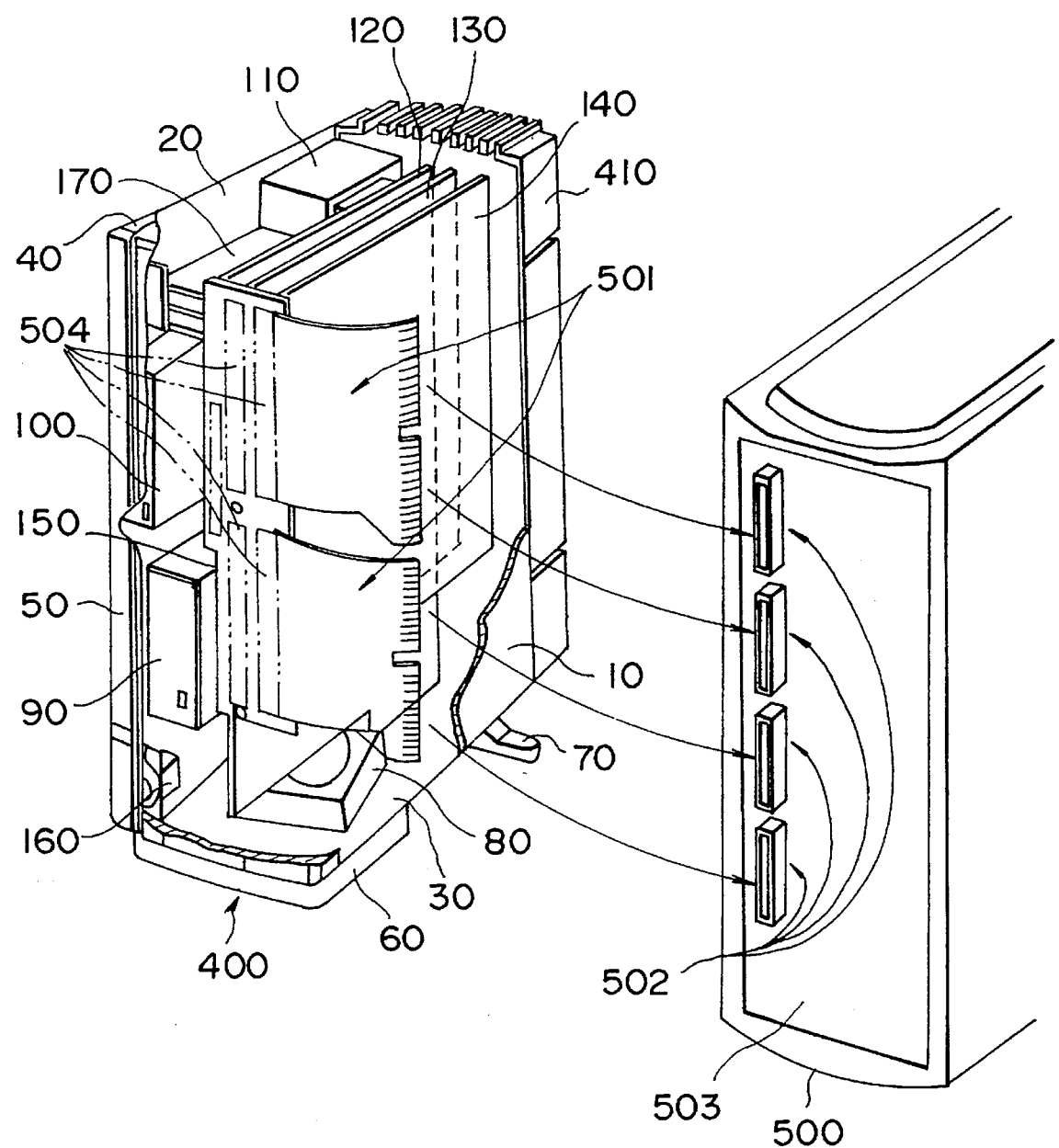
FIG. 16 is a perspective view showing the manner in which one box is connected with another-box via a bus.

In FIG. 16, reference numeral 400 designates a box of the essentially body of the apparatus; 500, an additional box; 501, a flexible printed circuit board (hereinafter called "FPC"); 502, a bus extension connector for the FPC; 503, a platter in the additional box 500; and 504, a bus connector. The remaining elements or units are similar to those of FIG. 1.

Preferably, the additional box 500 is identical at least in height and depth with the box 400.

To the platter 150 of the box 400 in FIG. 16, the FPC 501 is attached. The FPC 501 is connected at one end thereof directly to the bus connector 504 of the option board 140 and at the other end to the bus expansion connector 502 on the platter 503 of the additional box 500. The platter 503 and the FPC 501 are disposed towards the front of each box 400, 503.

Figure 17:
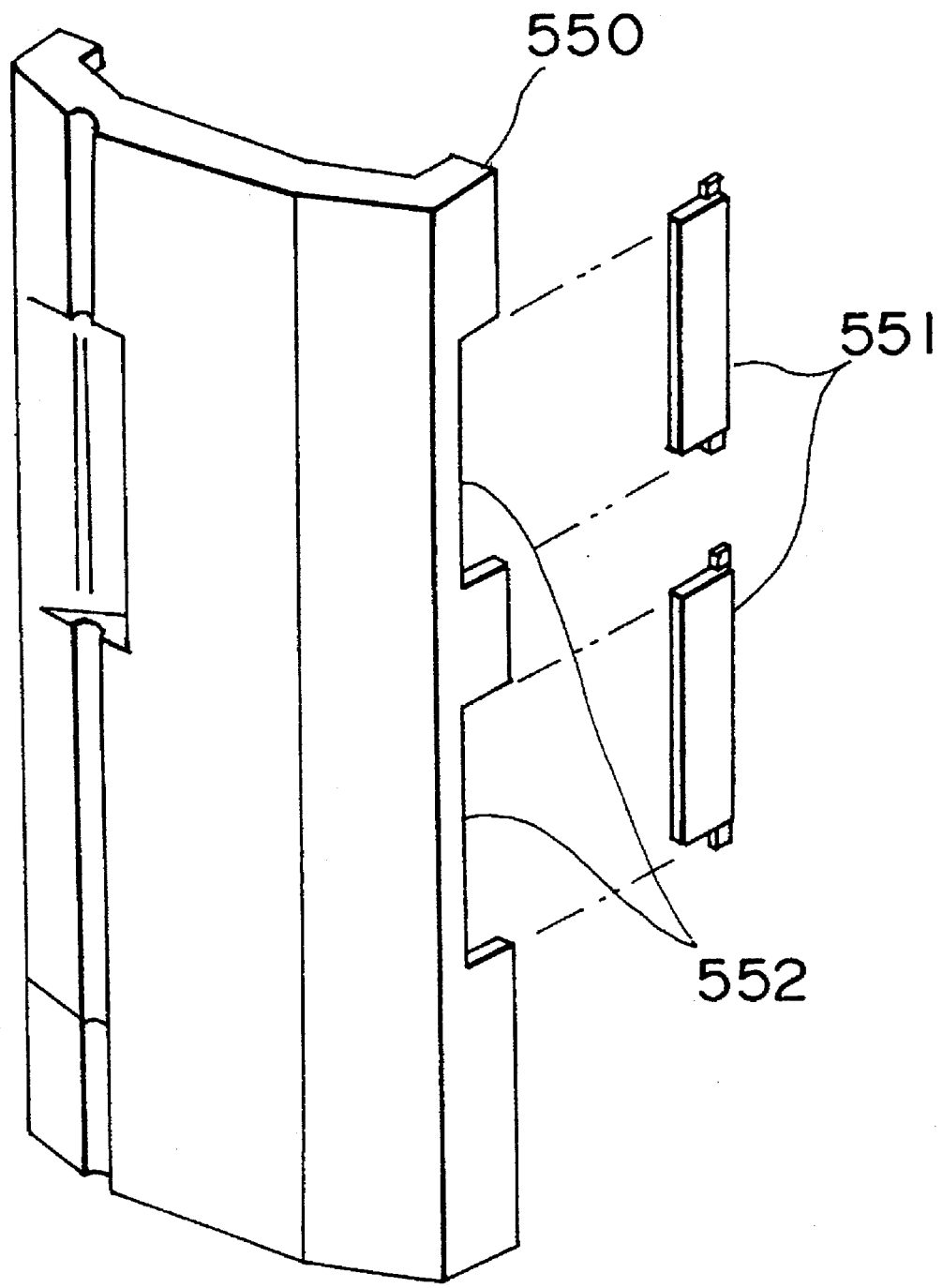
FIG. 17 is a perspective view of a front panel of the box.

As shown in FIG. 17, the front panel 550 has a cutout 552 through which the FPC 501 extends from the base box 400 to the additional box 500. A cover 551 is attached to the front panel 550 for covering the cutout 552 when no expansion is needed.

Thus, the result with the FPC 501 is that the length of the bus can be reduced to a minimum, as compared with the conventional bus expansion feature using flat cables and a flat cable connector or the like. It is possible to minimize a reactance component and a load capacity, which are undesirable for increasing the processing speed and/or expanding a bit width of data/address or the like. Further, since the FPC 501 extends from the side of the front panel 550, which is not so noticeable when seen from the front side of the boxes 400, 500, the appearance of the apparatus is not spoiled. In addition, special cable treatment is not needed. Furthermore, FPCs 501 are provided at positions corresponding to the connectors 502 to be connected thereto, respectively. With this arrangement, possible mis-connection can be prevented.

Figure 18:
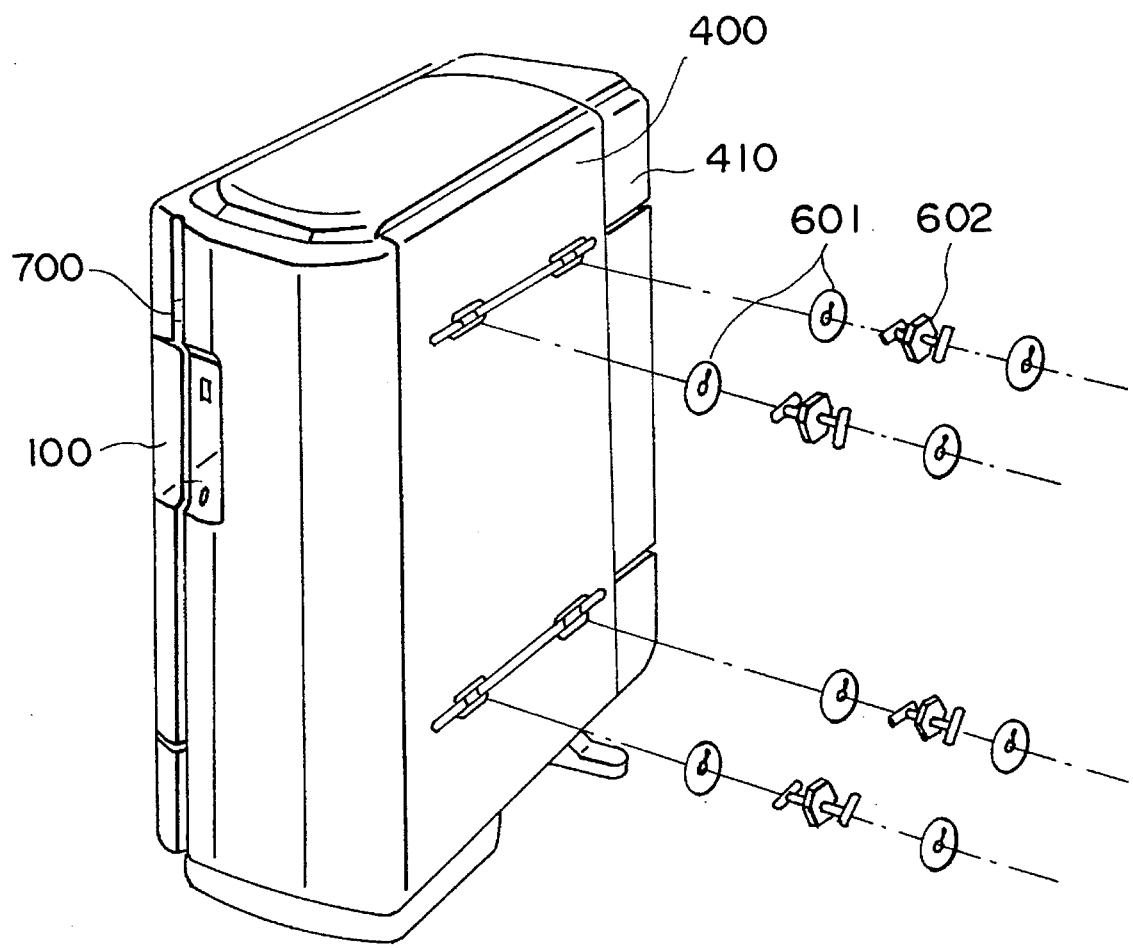
FIG. 18 is a perspective view showing the manner of connection when another box is to be added.

In the illustrated embodiment, the physical connection of the boxes 400, 500 is reinforced as shown in FIG. 18 to protect the FPC 501.

In FIG. 18, reference numerals 601 and 602 designate a washer and a joint member, respectively, for physically connecting the box 400 with the additional box 500. For expansion or connection, the pads, if attached, are removed from the boxes, and the washer 601 and the joint member 602 are used therefor. Specifically, the individual boxes 400, 500 each have a groove whose bottom has at least one hole for insertion of the joint member 602 to join the box 400 with the additional box 500. In the absence of any additional box, a pad (e.g., a rubber leg) is received in the groove of the box for the horizontal installation.

With this arrangement, it is possible to prevent the FPC 501 from being damaged due to slippage or pulling between the two boxes 400, 500. Since the two boxes are arranged with their front panels flush with each other, there is no discomfort created for the user, whatsoever even when the boxes are arranged contiguously to office file binders.

Further, since the side surface to which the floppy disk unit 100 is attached will be a top surface when the apparatus is placed in a horizontal posture, the operativity cannot be deteriorated.

The power supply unit 110 will now be described with reference to FIG. 19, which is a detailed perspective view of the power supply unit 110 shown in FIG. 1.

Figure 19:
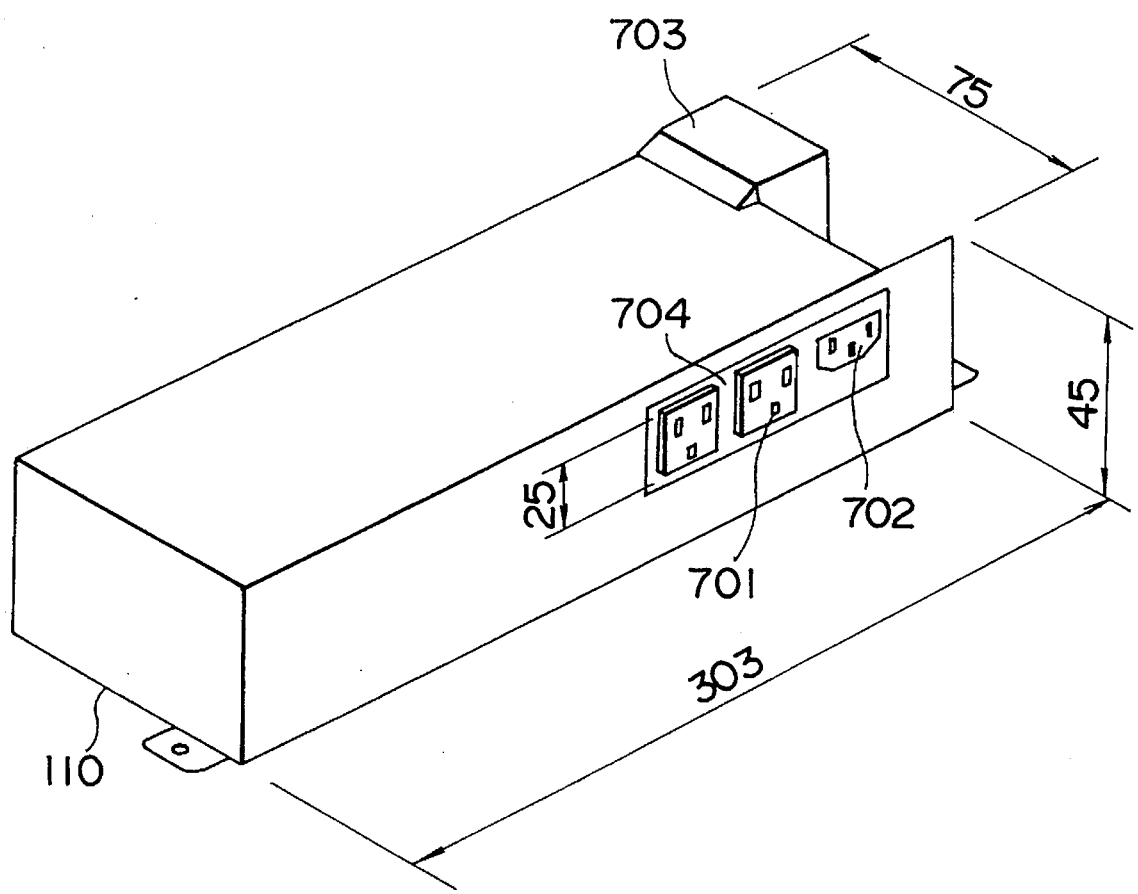
FIG. 19 is a perspective view of a power supply unit.

In FIG. 19, reference numeral 701 designates a power supply connector; 702, a three-pin power supply plug; 703, a fan independent of the heat-exhaust fan 80 and dedicated to the power supply unit 110; and 704, a rear power supply panel to which the power supply connector 701 and the power supply plug 702 are to be attached. The power supply unit 110 is in the shape of a rectangular parallelopipedon, 300 mm wide, 45 mm high and 75 deep. Given that the power supply unit 110 has such a contour, the individual elements and units can be arranged in the first layer, in which the magnetic disk 90 is disposed, of the imaginary-double-layer apparatus.

The structural features of the leg 402 shown in FIGS. 14A and 14B will now be described. The connecting portion 810 joining the legs 800, 801 together is slender, as shown in FIGS. 14A and 14B, so that the legs 402, 403 can be prevented from overlapping each other and that heat-exhaust air from the dedicated fan 703 can be discharged with ease. Therefore it is discomfort due to the hot air and noise from the heat-exhaust is avoided.

The foregoing interior packaging and physical system of the box are suitable to office processors, such as a workstation and a personal computer, as well as a data processing apparatus such as a word processor.

According to the illustrated embodiments, it is possible to reduce the apparatus to a compact size, to improve the stability when the apparatus is installed in a vertical posture, and to realize a good cooling efficiency. Also a physical system structure in which a data processing apparatus and a keyboard are accommodated in a compact space. Thus, this invention can contribute to an effective use of an office space and provide a comfortable office environment.

What is claimed is:

1. A data processing apparatus, comprising:

a disk unit comprising a storage-medium-non-exchange-type disk unit and a storage-medium-exchangeable disk unit, said storage-medium-non-exchange-type disk unit being disposed under said storage-medium-exchangeable disk unit;

a power supply unit;

at least one first printed circuit board;

a heat-exhaust fan; and a box accommodating said disk unit, said power supply unit, said at least one first printed circuit board and said heat-exhaust fan, said box having a depth and a height which are both larger than its width, said box also having first and second side surfaces defined by said depth and height, bottom and top surfaces defined by said depth and width, and front and rear surfaces defined by said height and width, said box having in its top portion an inlet through which air is to be introduced into said box;

first and second legs disposed on front and rear portions, respectively, of said bottom surface of said box, said first and second legs being detachably mounted on said bottom surface of said box, wherein said first leg has a load bearing portion bearing a partial load of said front surface and said first and second side surface, said first leg having a rearwardly opening hollow portion disposed inwardly of said load bearing portion, and said first leg further having a side thereof being cutout for communicating said hollow portion with the space outside of said first leg;

said disk unit and said power supply unit being disposed adjacent to said first side surface of said box, said first printed circuit board being disposed adjacent to said second side surface, said disk unit being disposed on said front surface, said power supply unit being disposed on said rear surface, said heat-exhaust fan being attached to said bottom surface of said box in a position so as to face said hollow portion of said first leg so as to blow air in said box out of said box.

2. A data processing apparatus comprising:

a disk unit comprising a storage-medium-non-exchange-type disk unit and a storage-medium-exchangeable disk unit, said storage-medium-non-exchange-type disk unit being disposed under said storage-medium-exchangeable disk unit;

a power supply unit;

at least one first printed circuit board;

a heat-exhaust fan; and a box accommodating said disk unit, said power supply unit, said first printed circuit board and said heat-exhaust fan, said box having a depth and a height which are both larger than its width, said box also having first and second side surfaces defined by said depth and height, bottom and top surfaces defined by said depth and width, and front and rear surfaces defined by said height and width, said box having in its top portion an inlet through which air is to be introduced into said box;

first and second legs disposed on front and rear portions, respectively, of said bottom surface of said box, said second leg extending transversely of said box in such a manner that a pair of opposite lateral ends of said second leg projects outwardly of said first and second side surfaces, respectively, wherein said lateral ends of said second leg are out of alignment with each other, depthwise, of said box;

said disk unit and said power supply unit being disposed adjacent to said first side surface of said box, said first printed circuit board being disposed adjacent to said second side surface, said disk unit being disposed on said front surface, said power supply unit being disposed on said rear surface, said heat-exhaust fan being attached to said bottom surface of said box so as to blow air within said box out of said box.

3. A data processing apparatus, comprising:

a disk unit comprising a storage-medium-non-exchange-type disk unit and a storage-medium-exchangeable disk unit, said storage-medium-non-exchange-type disk unit being disposed under said storage-medium-exchangeable disk unit;

a power supply unit;

at least one first printed circuit board;

a heat-exhaust fan; and a box accommodating said disk unit, said power supply unit, said first printed circuit board and said heat-exhaust fan, said box having a depth and a height which are both larger than its width, said box also having first and second side surfaces defined by said depth and height, bottom and top surfaces defined by said depth and width, and front and rear surfaces defined by said height and width, said box having in its top portion an inlet through which air is to be introduced into said box;

first and second legs disposed on front and rear portions, respectively, of said bottom surface of said box, said first and second legs being detachably mounted on said bottom surface of said box, wherein said first leg has a load bearing portion bearing a partial load of said front surface and said first and second side surface, said first leg having a rearwardly opening hollow portion disposed inwardly of said load bearing portion, and said first leg further having a side thereof being cutout for communicating said hollow portion with the space outside of said first leg, said cutout being located at a position where it is aligned with a cutout of another apparatus or unit when said another apparatus or unit is placed contiguously;

said disk unit and said power supply unit being disposed adjacent to said first side surface of said box, said first printed circuit board being disposed adjacent to said second side surface, said disk unit being disposed on said front surface, said power supply unit being disposed on said rear surface, said heat-exhaust fan being attached to said bottom surface of said box in such a position as to face said hollow portion of said first leg so as to blow air within said box out of said box.

* * * * *